J. W. KENNEDY.
Hose-Coupling.

No. 213,577.　　　　Patented Mar. 25, 1879.

ATTEST:
Robt Burns.
Charles Pickley

INVENTOR
Josiah W Kennedy

UNITED STATES PATENT OFFICE.

JOSIAH W. KENNEDY, OF ST. LOUIS, MISSOURI.

IMPROVEMENT IN HOSE-COUPLINGS.

Specification forming part of Letters Patent No. 213,577, dated March 25, 1879; application filed December 27, 1877.

*To all whom it may concern:*

Be it known that I, JOSIAH W. KENNEDY, of St. Louis, in the State of Missouri, have invented a new and useful Improvement in Hose-Couplings, of which the following is a specification:

My invention relates to the mode of securing the hose to the coupling; and it consists in the formation of a coupling for conducting-hose, made with two concentric bands or cylinders cast in one piece, or so united to each other by means of a continuous bottom as to form an annular chamber between them, with an annular opening or mouth to receive the end of the hose, which is securely held therein by either the expansion of the inner cylinder or the contraction of the outer cylinder, compressing and binding the hose between the two interior surfaces of the annular chamber; and this annular chamber may be formed with an irregular or corrugated interior surface, to more firmly and effectually gripe and hold the hose.

The surface of the two bands that come in contact with the hose may be provided with suitable projections and recesses, in order to more firmly and effectually hold the hose.

Figure 1:
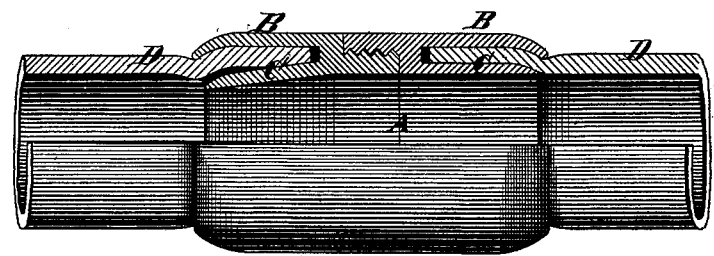
Figure 2:
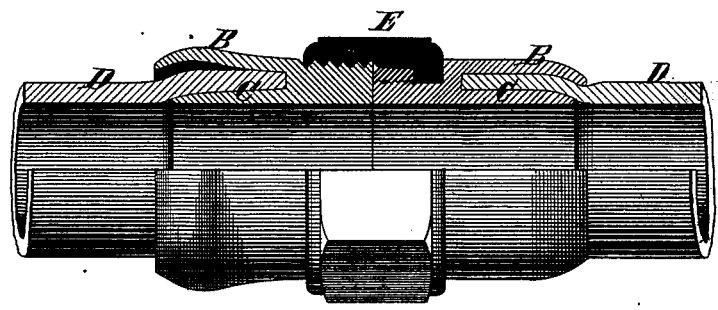

In the drawings, Figure 1 is a view, one-half in section and one-half in side view, with the ends screwed together. Fig. 2 is a similar view, with the ends secured together by a "union"-coupling.

A is the hose-holder, which is formed with two annular bands or rings, B C, between which the hose D is held.

The ends of the holders may be fitted so as to screw together, as shown in Fig. 1, or be secured together by an ordinary union-coupling, E, as shown in Fig. 2.

The holder A is formed of ductile or compressible metal, and either the ring B can be compressed onto the hose, or the inner ring can be expanded against the hose, so as to firmly clamp the hose end in position.

The inner surface of the ring B and outer surface of the ring C may be formed with ridges and depressions, for more effectually holding the hose.

In the drawings, the left-hand side of the figures shows the construction of the holder before the hose is secured in it, while the right-hand side of the figures shows the hose clamped between the rings or bands.

The advantages derived from my improved construction are: It is much stronger, and will hold the hose more firmly than the usual form of couplings, as there is no danger of the parts drawing out of each other when strain is brought on the parts. It also obviates the necessity of packing to prevent the water getting to the hose end and causing the same to rot. It can be readily applied to hose, and the difficulty of parts being misapplied is entirely obviated.

I claim as my invention—

A hose-coupling having the clamping-bands B C formed in one piece, as and for the purpose set forth.

JOSIAH W. KENNEDY.

Witnesses:
 ROBT. BURNS,
 CHARLES PICKLES.